Jan. 9, 1923.

H. D. LILLIBRIDGE.
CRUCIBLE.
FILED JUNE 27, 1919.

Inventor
Harry D. Lillibridge
By his Attorney

Jan. 9, 1923.

H. D. LILLIBRIDGE.
CRUCIBLE.
FILED JUNE 27, 1919.

INVENTOR.
Harry D. Lillibridge
By H. J. Burchard
Attorney.

Patented Jan. 9, 1923.

1,441,690

UNITED STATES PATENT OFFICE.

HARRY D. LILLIBRIDGE, OF ZANESVILLE, OHIO, ASSIGNOR TO AMERICAN ENCAUSTIC TILING COMPANY, LTD., OF NEW YORK, N. Y., A CORPORATION OF NEW YORK.

CRUCIBLE.

Application filed June 27, 1919. Serial No. 307,171.

*To all whom it may concern:*

Be it known that I, HARRY D. LILLIBRIDGE, a citizen of the United States, residing at Zanesville, county of Muskingum, and State of Ohio, have invented a certain new and useful Crucible, of which the following is a specification.

This invention is a crucible, the same being composed of chemical porcelain and the contour of which is scientifically fashioned to attain high thermal resistance.

Prior to setting forth the invention of this application, it is not out of order to state, as briefly as may be, somewhat of the history of the art of chemical porcelain, particularly with reference to crucibles. Those skilled in the art are well aware that for many years porcelain crucibles of German manufacture have been the standard in the chemical industries by reason of the fact that the high kaolonic compositions employed in the production of crucibles possess the thermal resistance required in crucibles for chemical service.

The essential technical difference between chemical porcelain and porcelain dinnerware, teaware, artware etc. is that chemical porcelain must be composed of such material and be so fashioned as to withstand the usages of the chemist's laboratory, whereas the domestic utilitarian and art wares are subject to no more severe tests than immersion in hot water and to more or less careless handling by domestics.

Satisfactory chemical porcelain involves no less than five essential properties which are (*a*) thermal resistance, i. e. resistance to rapid extreme heating and cooling without fracture, (*b*) resistance to alkalies, (*c*) glaze resistance to high temperatures, (*d*) resistance to shock in handling when heated to a high temperature, and (*e*) lightness, translucency and a smooth glaze finish.

Experiments conducted with chemical porcelain crucibles of the character now on the market establish conclusively that certain wares do not withstand the extreme temperatures required, the products now under consideration consisting of a cone 14 porcelain having a good appearance and while proving useful for ordinary laboratory work, such crucibles do not possess the thermal resistance essential for chemical porcelain, the tests establishing, further, that such porcelain wares are wholly unsuited for crucibles, dishes and casseroles.

Independently of the bodies and glazes, the property of thermal resistance is a most important and essential factor, it being determined that a porcelain possessing the required thermal resistance is almost certain to possess the other essentials; but it is found that while the porcelain may have the required resistance to alkalies, shock, glaze resistance to high temperatures, and be otherwise satisfactory as to lightness and translucency, it does not follow that such porcelain will stand the thermal resistance tests. This test (thermal resistance) consists in heating the crucible until it becomes bright red by the agency of a blast burner, removing the crucible so heated by the aid of tongs, and applying a blast of cold air, such test being repeated a number of times, ten or more. In the experimental work heretofore conducted with crucibles now on the market, no domestic ware stood the thermal resistance test successfully, especially if the crucible was heated unevenly, although some foreign made crucibles of 25 mm., or less, stood the test fairly well, but all larger sizes cracked before the third heating, and, further, some of the German crucibles will also stand the thermal resistance test provided they do not exceed 30 mm. in width, and here again the larger sizes of crucibles cracked after the third or fourth heating. Tests of the various makes established that some of the chemical porcelains which were obviously superior to others did not possess the same thermal resistance, and that there is a wide difference in crucibles of the same make, especially in the tests of different sizes of crucibles, as a result of which experimentation the investigation turned in the direction of shape or contour in the construction.

The art shows that there have been practically no developments in the shape construction of chemical crucibles, it appearing that potters are now making the same identical shaped crucibles which have been in use for centuries; the German ware being fashioned according to an old type crucible, and other makers having followed the pattern. Although no inconsiderable research work in the direction of body composition and glaze composition has been done in the past, it does not appear that there has been an appreciable effort made in the development of the shape in construction with a view to increasing the thermal resistance. Owing to the combination of materials in chemical porcelain, the temperature necessary to mature the body is so great that the shape undergoes a contraction varying from 20% to 25%, and even greater in some instances. In addition to contraction, there is a condition wherein every flaw or fault in the material is exaggerated to a marked extent during the firing operation. It has been determined that shapes of certain constructions undergo changes in proportion during the firing, that is, one shape after firing will have greater diameter in proportion to its height, whereas another shape possesses greater height in proportion to the diameter, such variation being due to the settling of the shape during contraction, especially at the temperature termed the maturing point, which is almost that of fusion.

In the tests of prior wares for thermal resistance it was noted that where the shapes exhibited evidence of faulty construction the crucibles failed under the thermal tests, and that as the tests were conducted on the shapes of increased sizes the crucibles were less able to stand the thermal resistance tests, whereas carefully designed models would meet the requirements.

The experimental work heretofore conducted establishes that the element of shape in construction is an important factor in crucibles composed of chemical porcelain, with a view to the production of a crucible immune to extreme thermal resistance tests.

As a result of the development work it was determined that a crucible composed of chemical porcelain, the wall of which is vertical cross section is a compound curve terminating in an outward flare at the mouth of the crucible, possesses such stability as will enable it to successfully withstand the extreme tests as to thermal resistance.

In illustration of the development work two charts are shown in Figs. 3 and 4 of the accompanying drawings, the cone C denoting the blaze from a blast burner. The heavy continuous black line A in Fig. 3 denotes the wall of the crucible and the curvature thereof indicates that shape in the body of the porcelain ware which is best calculated to resist the thermal test, such tests establishing that the variations in the body contour indicated in the various dotted lines, have a tendency to reduce or weaken, and ultimately fracture, under the thermal resistance test.

The chart Fig. 4 illustrates graphically the development in the cross sectional contour of the body at the mouth of the crucible, the heavy black line B denoting the shape at the mouth which successfully stands the extreme thermal resistance tests, whereas the contours at the mouth denoted by the broken lines are illustrative of the shapes which fail under the extreme thermal resistance tests.

Figure 1:
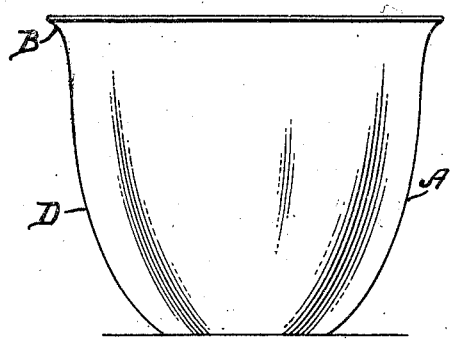
Fig. 1 is an elevation of my new chemical porcelain crucible.
Figure 2:
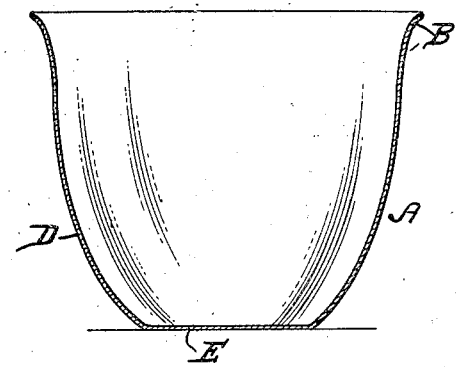
Fig. 2 is a vertical sectional elevation thereof.

The crucible shown in Figs. 1 and 2 is composed of chemical porcelain for resistance to alkalies and glaced for resisting high temperatures. The wall D and bottom E of the crucible are relatively thin, and the porcelain possesses the required translucency and lightness.

Figure 5:
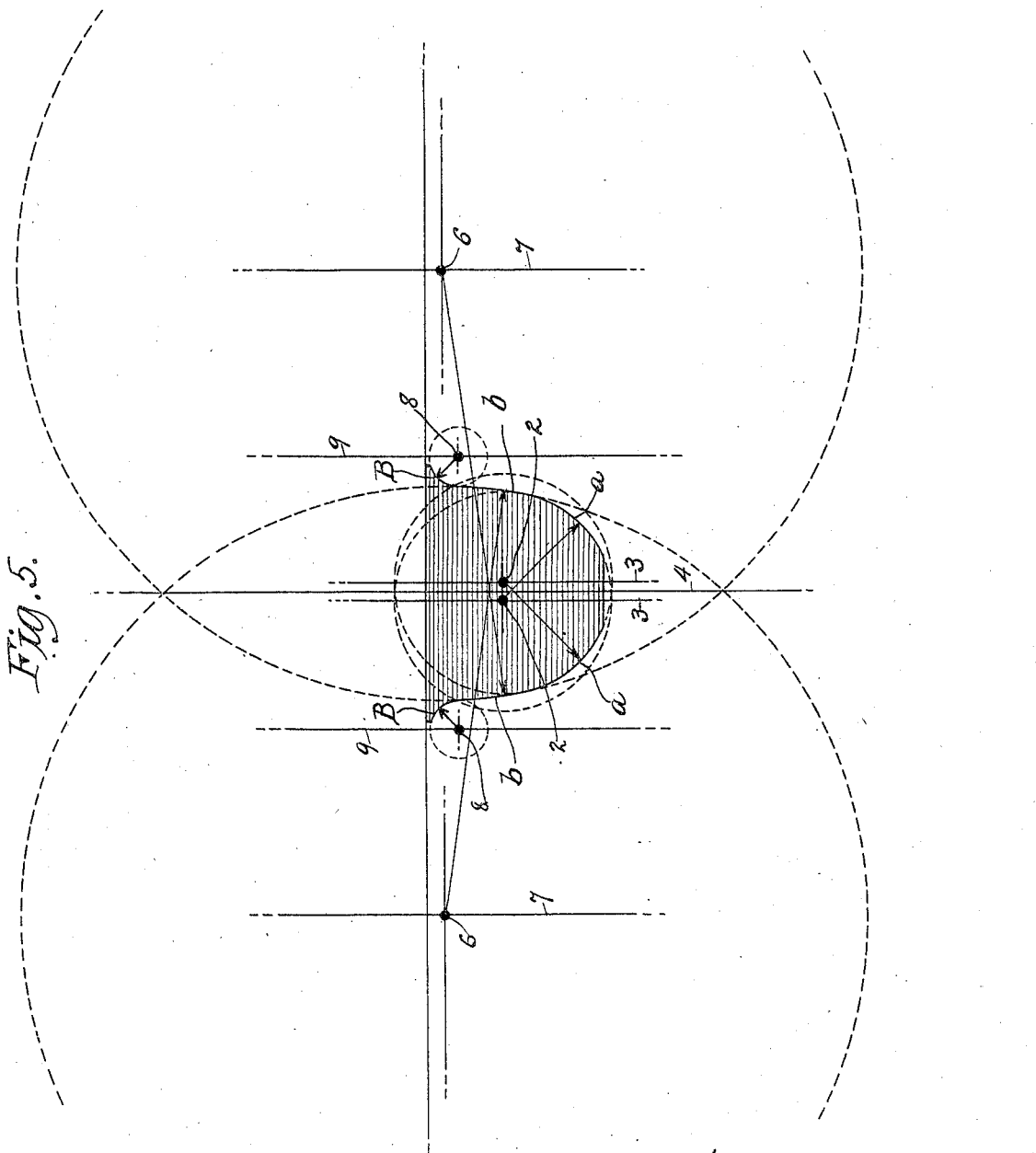
Figure 5 is a diagrammatic view illustrating the mode of generating the curves defining the contour of the crucible.

The walls of the crucible in vertical cross section is a compound curve beginning at the margin of the bottom E and extending to the edge of the outwardly flared mouth portion. The curvature of the crucible wall is made up of three intersecting curves generated from three separate centers as shown diagrammatically in Figure 5. Beginning at the bottom, the first curve $a$ is generated on an axis 2 intersected by a perpendicular 3 parallel and close to the axial line 4 of the crucible; the second curve $b$ is of greater radius than the first curve $a$ and is generated on an axis 6 intersected by a perpendicular 7 located remote to the axial line 4 and parallel therewith; and the third curve B is of less radius than either $a$ or $b$ and is generated on an axis intersected by a perpendicular 9, the latter being between the perpendicular 7 and axial line 4 and adjacent to a line crossing the open mouth of the crucible. As shown in the several figures, and particularly in Figure 5, the curves $a$ intersect with the curves $b$ and define the outline of the crucible body, whereas the curves B of shortest radius, intersect with the curves $b$ and define the under surface or curvature of the outwardly flared mouth portion.

The curves $a$, $b$, in effect constitute the curvature of the body portion denoted at A in Figures 1 to 4, and the several curves result in a crucible which in vertical cross section may be said to be a compound curve.

Figure 4:
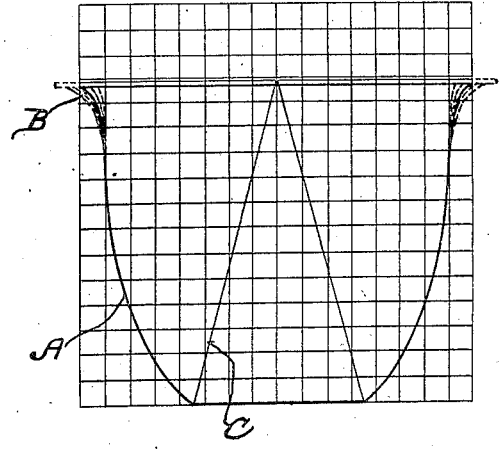

As shown, the body curvature as it rises from the flat bottom E bulges outwardly until well above one half the height of the crucible, and thereupon the curvature is reversed so that the curve toward the open top of the crucible is an outward flare, producing a well defined marginal flange constituted by the curve B in Fig. 4.

By reason of the compound curvature of the wall and the outward flare at the mouth, the crucible varies in diameter at different points intermediate its height, the base of the crucible being of the least relative diameter.

As pointed out, the wall in vertical cross section comprises not less than three curves generated on centers located at different distances from the vertical central axis of the crucible. With respect to said curves which impart the compound curvature to the crucible wall, the radius of the lowermost curve exceeds the diameter of the base portion of the crucible.

Figure 3:
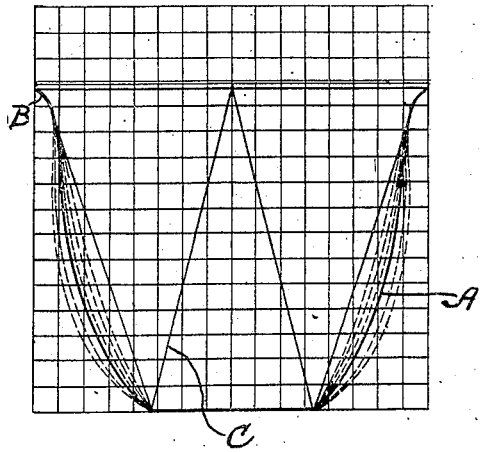
Figs. 3 and 4 are diagrams, as stated, illustrative of the development work in connection with the shapes of the body and the mouth of the crucibles.

Tests of the body construction depicted in Fig. 3 extended over a large variety of shapes composed of different porcelain bodies and of varying thicknesses. Such tests included the firing of the crucibles at temperatures varying from cone 12 to cone 20. As a result of the tests, the crucibles possessing the body curvature A in Fig. 3 best withstood the thermal resistance test in every instance, and such tests established conclusively that body shape or contour is one of the factors contributing to the production of crucible capable of withstanding the required thermal resistance.

In view of the demonstrated fact that a slight variation in the shape had an appreciable effect upon the thermal resistance of the crucible, it became important to determine within the narrowest margin the shape which best withstood the thermal resistance test. Crucibles varying in height, diameter, and thicknesses were subjected to elaborate and repeated tests, as a result of which the crucible of the form shown in Figs. 1 and 2 successfully withstood all tests, including the thermal resistance test.

The flange at the mouth of the crucible is the result of the outward flare given by the reversal in the direction of the compound curvature of the wall in cross section, and the tests referred to established that such outward curvature is another of the important factors in the shape of the crucible, for the reason that the compound curvature in the contraction of the crucible after firing and while undergoing the cooling operation precludes any tendency to fracture or to crack, and, further, the flange at the mouth obtained by the outward flare in the compound curve enables the crucible, when heated to the temperature required, to be handled by the aid of tongs, as is necessary, without breaking or cracking when cold tongs are applied in mechanical contact with the highly heated porcelain for removing it from the blast heat. As shown, the crucible is provided with a flat bottom E, but this particular form is not essential, for the reason that the bottom may, if desired, be provided with a plurality of feet, although the use of such feet imparts to the crucible an external contour more or less awkward in the operation of casting or molding the porcelain with pendant feet.

In the manufacture of crucibles according to this invention great care and accuracy are required in the production of mechanically perfect porcelain ware. As the element of warpage enters largely in the manufacture of high temperature porcelain; it follows that an almost imperceptible imperfection or mechanical inaccuracy becomes quite noticeable when the ware is subjected to the high temperatures in firing the ware, the tests having shown that warped porcelain possesses less thermal resistance than mechanically perfect ware. So far as I am aware, porcelain ware for chemical crucibles has heretofore been molded from plaster casts, but the tests showed conclusively that the use of plaster casts in molding the chemical porcelain resulted in the production of crucibles more or less imperfect and mechanically inaccurate. Accordingly, I prepare a template corresponding in every detail to the model crucible, and from this template a metal die is prepared, from which metal die the porcelain ware is molded in order to obtain the accuracy required to minimize mechanical inaccuracy and the attendant warpage in the porcelain when fired.

Having thus fully described the invention, what I claim as new and desire to secure by Letters Patent is:

1. A crucible composed of chemical porcelain the wall of which in vertical cross section is a compound curve producing an outwardly flaring mouth portion, said crucible being of varying diameter at different points intermediate its height and the base of said crucible being of the least relative diameter and the cross sectional contour of said wall comprising not less than three curves generated on centers located at different distances from the vertical central axis of the crucible, the radius of the lowermost curve of said three curves exceeding the diameter of the base.

2. A crucible composed of chemical porcelain, the wall of said crucible in vertical cross-section being a compound curve produced by the intersection of not less than three curves generated on different centers, the radius of the lowermost of said curves exceeding the diameter of the base portion of said crucible.

In testimony whereof I have hereunto signed my name this 24th day of June, 1919.

HARRY D. LILLIBRIDGE.